United States Patent
Ilan et al.

(10) Patent No.: US 9,378,418 B2
(45) Date of Patent: Jun. 28, 2016

(54) METHODS AND SYSTEM FOR CLASSIFYING, PROCESSING, AND/OR GENERATING AUTOMATIC RESPONSES TO MAIL ITEMS

(71) Applicant: Top Image Systems Ltd., Ramat-Gan (IL)

(72) Inventors: Oren Ilan, Tel-Aviv (IL); Yoel Rotem, Kfar-Sirkin (IL)

(73) Assignee: Top Image Systems Ltd., Ramat-Gan (IL)

( * ) Notice: Subject to any disclaimer, the term of this patent is extended or adjusted under 35 U.S.C. 154(b) by 170 days.

(21) Appl. No.: 14/078,637

(22) Filed: Nov. 13, 2013

(65) Prior Publication Data

US 2014/0133696 A1   May 15, 2014

Related U.S. Application Data

(60) Provisional application No. 61/725,575, filed on Nov. 13, 2012.

(51) Int. Cl.
*G06K 9/00* (2006.01)
*H04L 12/58* (2006.01)

(52) U.S. Cl.
CPC ............ *G06K 9/00536* (2013.01); *H04L 51/14* (2013.01); *H04L 51/16* (2013.01); *H04L 51/02* (2013.01)

(58) Field of Classification Search
CPC .............. B07C 3/00; B07C 1/00; B07C 5/00; B07C 5/36; B07C 5/3412; G07B 17/00661; G07B 17/00443; G07B 17/00677; G07B 17/00588; G07B 17/00475; G07B 17/00717; G07B 17/0004; G07B 17/00725; H04L 51/16; H04L 51/02; H04L 51/14; G06K 9/00536; G06K 9/20; G06K 9/2063; G06K 9/36
See application file for complete search history.

(56) References Cited

U.S. PATENT DOCUMENTS

| | | | | |
|---|---|---|---|---|
| 2005/0149765 | A1* | 7/2005 | Aldstadt | G06Q 10/08 713/300 |
| 2006/0010217 | A1* | 1/2006 | Sood | H04L 51/12 709/206 |
| 2008/0215686 | A1* | 9/2008 | Meredith | G06Q 10/107 709/206 |
| 2009/0121163 | A1* | 5/2009 | Kinnemann | B65H 7/125 250/559.07 |
| 2009/0322943 | A1* | 12/2009 | Kasano | G06F 17/30781 348/468 |
| 2010/0036786 | A1 | 2/2010 | Pujara | |

OTHER PUBLICATIONS

Communication Pursuant to Rules 70(2) and 70a(2) EPC and Reference to Rule 39(1) EPC Dated Jun. 16, 2014 From the European Patent Office Re. Application No. 13192731.1.
European Search Report and the European Search Opinion Dated May 9, 2014 From the European Patent Office Re. Application No. 13192731.1.

* cited by examiner

Primary Examiner — Amara Abdi

(57) ABSTRACT

A computerized method of classifying a received mail item in real time. The computerized method comprises identifying a unique identifier (ID) by analyzing a new mail item from a certain sender, identifying, according to the unique ID, a matching correspondence session which is held with the certain sender, the matching correspondence session comprises a sequence of previously sent mail items, selecting a mail class from a plurality of mail classes, using a processor, the mail class is selected according to an analysis of the sequence of previously sent mail items and as a mail item that continues the sequence of previously sent mail items, and forwarding the new mail item or a visualization thereof according to the mail class.

20 Claims, 5 Drawing Sheets

METHODS AND SYSTEM FOR CLASSIFYING, PROCESSING, AND/OR GENERATING AUTOMATIC RESPONSES TO MAIL ITEMS

BACKGROUND

The present invention, in some embodiments thereof, relates to mail processing and, more specifically, but not exclusively, to methods and systems of classifying, responding, and/or enhancing the processing of mail items, such as postal mails and emails.

Worldwide nowadays, several hundred billion pieces of postal mail are delivered by national postal services. Similarly, the number of electronic mails which are transmitted to a general address of organizations increases every year.

To handle massive volume of postal mails several methods utilizing automatic means have been experimented with and installed on a limited operational basis. Quite often, this automatic means revolve around optical character recognition (OCR). For example, in a current process of automatic sorting, postal mail items are image scanned using a designated hardware to create image data. Areas of interest in the image data are analyzed. For example, information fields in the address block corresponding to destination inclusive of city, street and recipient are delineate and interpret. Once an address location has been determined and the character information fields discerned and optically recognized, the constituent address fields are found. This allows mail sortation where mail pieces are mechanically separated to a desired level to facilitate delivery.

Different methods have been developed to handle with massive volume of electronic mails, usually based on a compliance of an electronic mail with one or more distribution rules.

SUMMARY

According to some embodiments of the present invention, there are provided a computerized method of classifying a received mail item in real time. The method comprises identifying a unique identifier (ID) by analyzing a new mail item from a certain sender, identifying, according to the unique ID, a matching correspondence session which is held with the certain sender, the matching correspondence session comprises a sequence of previously sent mail items, and selecting a mail class from a plurality of mail classes, using a processor, the mail class is selected according to an analysis of the sequence of previously sent mail items and as a mail item that continues the sequence of previously sent mail items.

Optionally, the computerized method further comprises forwarding the new mail item or visualization thereof according to the mail class.

Optionally, the matching correspondence session is associated with a correspondence session lexicon that includes a plurality of terms; the mail class is selected using the correspondence session lexicon.

Optionally, the mail class is selected according to a match to one of a plurality of unified classification models.

Optionally, the computerized method further comprises analyzing the new mail item to extract at least one classifying expression from the content thereof; wherein the classifying is performed according to the at least one classifying expression.

More optionally, the at least one classifying expression is identified using a semantic analysis of the content of the new mail item.

More optionally, the classifying is performed according to a match between the at least one classifying expression and at least one reference classifying expression from a class lexicon that is associated with the selected class mail and includes a plurality of reference terms.

More optionally, the at least one classifying expression is identified using a contextual analysis of the content of the new mail item.

Optionally, the identifying a sender ID comprises imaging the new mail item while it is conveyed by a mail sorting machine having a plurality of sorting passes; wherein the forwarding comprising selecting one of the plurality of sorting passes according to the selected mail class.

Optionally, the computerized method further comprises scanning the new mail item to generate a pixelated graphic file and performing an identification of characters from the pixelated graphic file and converting them into a regular text file based on data from the sequence of previously sent mail items.

More optionally, the classifying comprises selecting one of a plurality of inboxes which are associated with a plurality of different handling entities of an organization according to the selected mail class and forwarding the pixelated graphic file to the selected inbox.

Optionally, the computerized method further comprises generating a response to the new mail item based on data from the sequence of previously sent mail items.

Optionally, the computerized method further comprises performing the generating according to data extracted from the sequence of previously sent mail items.

More optionally, the generating comprises matching between the sequence of previously sent mail items and a plurality of scenarios to identify a response template for the response.

More optionally, the generating comprises: selecting a response template based on data from the sequence of previously sent mail items, and automatically filling the response template using data extracted from the sequence of previously sent mail items.

Optionally, the computerized method further comprises iteratively repeating the identifying a sender ID, the identifying a matching correspondence session, the selecting, and the forwarding for a plurality of new mail items which are received in real time and updating in each iteration a record documenting a respective the matching correspondence session.

Optionally, the computerized method further comprises scanning the new mail item to generate a pixelated graphic file; wherein the selected mail class is associated with a class lexicon that includes a plurality of terms; further comprising performing an identification of characters from the pixelated graphic file using the class lexicon.

According to some embodiments of the present invention, there are provided a method of facilitating a semi automatic classification of mail item in real time. The method comprises receiving from a sender a new mail item having a unique identifier (ID), extracting the unique ID by an analysis of the mail item, identifying, using a processor, according to the unique ID, a matching correspondence session which is held with the sender, the matching correspondence session comprises a sequence of previously sent mail items held with the sender, identifying a plurality of a mail classes as suitable for the new mail according to the matching correspondence session, presenting the plurality of a mail classes to a user, receiving from the user a selection indicative of a first of the plurality of a mail classes, and classifying the new mail item according to the selection.

According to some embodiments of the present invention, there are provided a method of generating a response to a mail item in real time. The method comprises identifying a sequence of a plurality mail items sent to or received from a user, identifying a new mail from the user which continues the sequence of a plurality mail items, automatically selecting, using a processor, a response template by matching the sequence of a plurality mail items with a plurality of template scenarios, and using the to the response template for generating a response to the new mail.

According to some embodiments of the present invention, there are provided a method of processing a mail item in real time. The method comprises identifying a sequence of a plurality mail items sent to or received from a user, analyzing, using a processor, the plurality of mail items to extract a plurality of classifying expressions, identifying a new mail from the user which continues the sequence of a plurality mail items, and automatically processing the content of the new mail according to the plurality of classifying expressions.

Optionally, the computerized method further comprises scanning the new mail item to generate a pixelated graphic file; wherein the processing comprises performing an identification of characters from the pixelated graphic file and converting them into a regular text file.

According to some embodiments of the present invention, there are provided a system of classifying a received mail item in real time. The system comprises an input unit which receives a new mail item from a certain sender, a processing unit which identifies a unique identifier (ID) by analyzing a visualization of the new mail and identifies, according to the unique ID, a matching correspondence session which is held with the certain sender, the matching correspondence session comprises a sequence of previously sent mail items, a classifying module which selects a mail class from a plurality of mail classes, the mail class is selected according to an analysis of the sequence of previously sent mail items and as a mail item that continues the sequence of previously sent mail items, and an interface which forwards the new mail item or a visualization thereof according to the mail class.

Optionally, the input unit which receives the visualization from a pixelated graphic file generated from imaging the new mail while it is conveyed on a sorting machine having a plurality of sorting passes; wherein the classifying module instructs the sorting machine to convey the new mail in one of the plurality of sorting passes.

Optionally, the input unit which receives the visualization from a pixelated graphic file generated from imaging the new mail while it is conveyed on a sorting machine having a plurality of sorting passes; wherein the classifying module forwards the visualization to one of a plurality of inboxes according to the classification.

Optionally, the new mail is an email sent to a general inbox; wherein the classifying module forwards the visualization to one of a plurality of specific inboxes according to the classification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
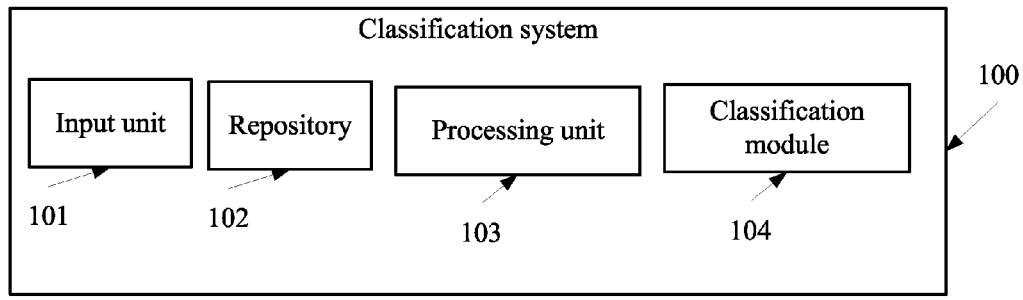
FIG. 1A is a schematic illustration of a classification system for sorting and/or classifying a plurality of mail items in real time, according to some embodiments of the present invention.

The present invention, in some embodiments thereof, relates to mail processing and, more specifically, but not exclusively, to methods and systems of classifying, responding, and/or enhancing the processing of mail items, such as postal mails and emails (with or without attachments which may be also classified as mail items).

According to some embodiments of the present invention, there are provided methods and systems of identifying a corresponding session that a received mail item continues and classifying the received mail item accordingly. The identification allows extracting data from a sequence of previously sent (historical) mail items which comprise the corresponding session and using this data for classifying the new mail. The classification is optionally based on semantic, contextual, statistical and/or circumstantial analysis of the extracted data. The classification predicts the likelihood of the received mail item to be related to a certain mail classification, for example a mail item that provides data to a certain department, a mail item that requests information about the status of a claim, a mail item that notifies an agreement abolishment and/or renewal to a certain individual and/or the like.

Optionally, a received mail item is matched to a certain correspondence session based on one or more identifiers which are extracted therefrom, such as the identity of the sender and/or a claim number. This identification narrows down the number of potential classes from a sum of all the possible classes for this organization. It should be noted that narrowing down the number of potential classes may be a part of a semi automatic process wherein a set of potentially matching potential classes is presented to a user that manually matches a received mail item with a member of the set. This process reduces the number of potential classes the user has to choose from and therefore reduces the required human labor time and adds quality to the decision.

According to some embodiments of the present invention, there are provided methods and systems of improving the processing of a received mail item based on data extracted from related previously sent mail items, for example from the correspondence session thereof and/or previously sent mail items which are related to a common handling entity. The extracted data may be used for improving, validating and/or correcting an optical character recognition (OCR) data of the received mail item.

According to some embodiments of the present invention, there are provided methods and systems of automatically or semi automatically creating a response to a received mail item based on data that is extracted from related previously sent mail items, for example from the correspondence session thereof.

According to some embodiments of the present invention, there are provided methods and systems of automatically or semi automatically prioritizing a mail item based on data that is extracted from related previously sent mail items, for example from the correspondence session thereof. The prioritizing may be indicative of the importance of the mail item to a certain organization. The prioritizing may be used to order the mail items, for example the order in which mail items are forwarded to a certain department and/or individual.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1A, which is a schematic illustration of a classification system 100 for sorting and/or classifying a plurality of mail items in real time, according to some embodiments of the present invention. The plurality of mail items may be postal and/or electronic mail items which are sent to a certain organization with a plurality of separate handling entities (e.g. departments and individuals), such as an insurance company, a bank, a university.

The classification system 100 includes an input unit 101 which receives and optionally processes mail items. The classification system 100 includes and/or connected to one or more repositories 102 (referred to as a repository 102) that document, for example store, a plurality of correspondence sessions with a plurality of senders (e.g. subscribers, costumers of a company, such as an insurance company, a database that stores applicant correspondences, a database that stores student correspondences and/or the like). In use, the repository 102 is updated according to received mail items and optionally according to mail items which are sent, for example in response to the received mail items. The updating may be automatic or manual. As used herein, a correspondence session is a sequence of one or more mail items which are related to one another and may be ordered according to a sending and/or receiving time, for example an exchange of emails and/or postal mails between a client and a service provider that manages the classification system 100.

The classification system 100 includes a processing unit 103 that processes, mail items, for example file, such as electronic files, such as portable document format PDF files, attachments to emails and/or visualizations of the mail items, for example pixelated graphic files produced by the input unit 101, for instance using an OCR module. Optionally, the processing unit 103 uses one or more processors for the processing. The classification system 100 further includes a classification module 104 that sorts mail items according to the output of the processing unit 103.

Figure 1B:
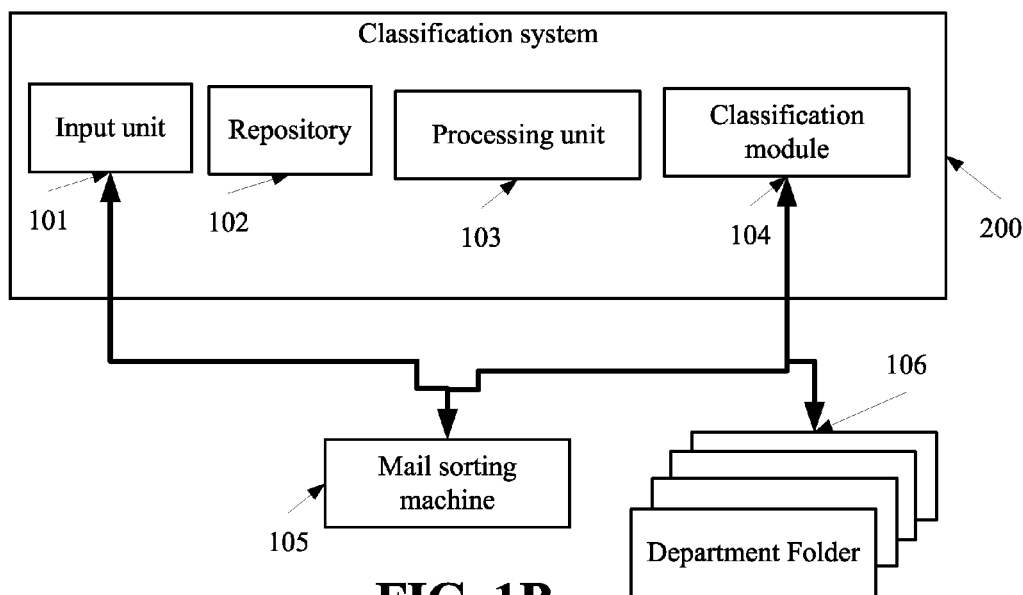
FIG. 1B is a classification system for managing one or more mail sorting machine(s), according to some embodiments of the present invention.

According to some embodiments of the present invention, for example as depicted in FIG. 1B, a classification system 200, which includes the components of the classification system 100, is used for managing one or more mail sorting machine(s) 105. The input unit 101 of the classification system 200 is connected to one or more document imaging modules (not shown) for scanning and/or otherwise imaging mail items which are conveyed in the mail sorting machine(s) 105 having plurality of sorting passes. In such embodiments, the classification module 104 instructs the mail sorting machine(s) 105 in a process of sorting the conveyed mail items in a plurality of sorting passes according to the calculations of the processing unit 103. Different sorting passes may be associated with mailboxes of different handling entities, such as departments and/or specific individuals, according to the calculations of the processing unit 103. Additionally or alternatively, the classification module 104 manages the forwarding of the visualizations of the mail items, for example the pixelated graphic files, in a process of sorting copies of the postal mail items to a plurality of inboxes and/or folders, such as 106, which are related to different handling entities, such as departments and/or specific individual or specific other automatic processes, according to the calculations of the processing unit 103.

Figure 1C:
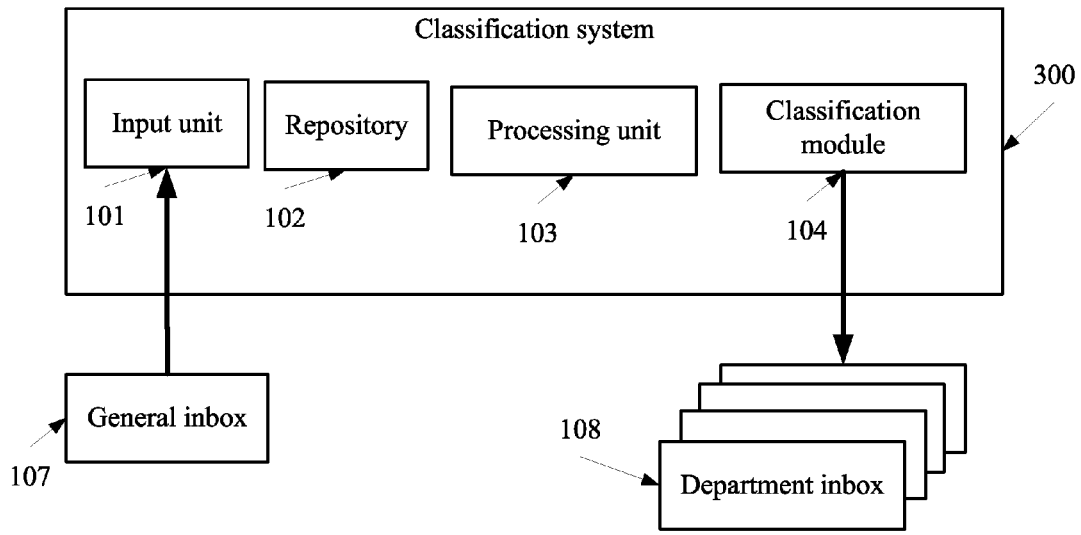
FIG. 1C is a classification system for managing one or more general email inboxes 107, according to some embodiments of the present invention.

According to some embodiments of the present invention, for example as depicted in FIG. 1C, a classification system 300, that includes the components of the classification system 100, is used for managing one or more general email inboxes 107. the input unit 101 is connected to one or more general mail inboxes 107 which are managed by one or more email applications and/or services, such as Outlook™ and/or Gmail™ service. In such embodiments, the classification module 104 instructs the email applications and/or services in a process of virtual sorting of mail items, such as emails and attachment to emails, to a plurality of inboxes and/or folders, such as 108, which are related to different handling entities, such as departments and/or specific individual, according to the calculations of the processing unit 103. The source of mail items may also be a folder any folder of electronic documents that represent mail items.

Figure 2:
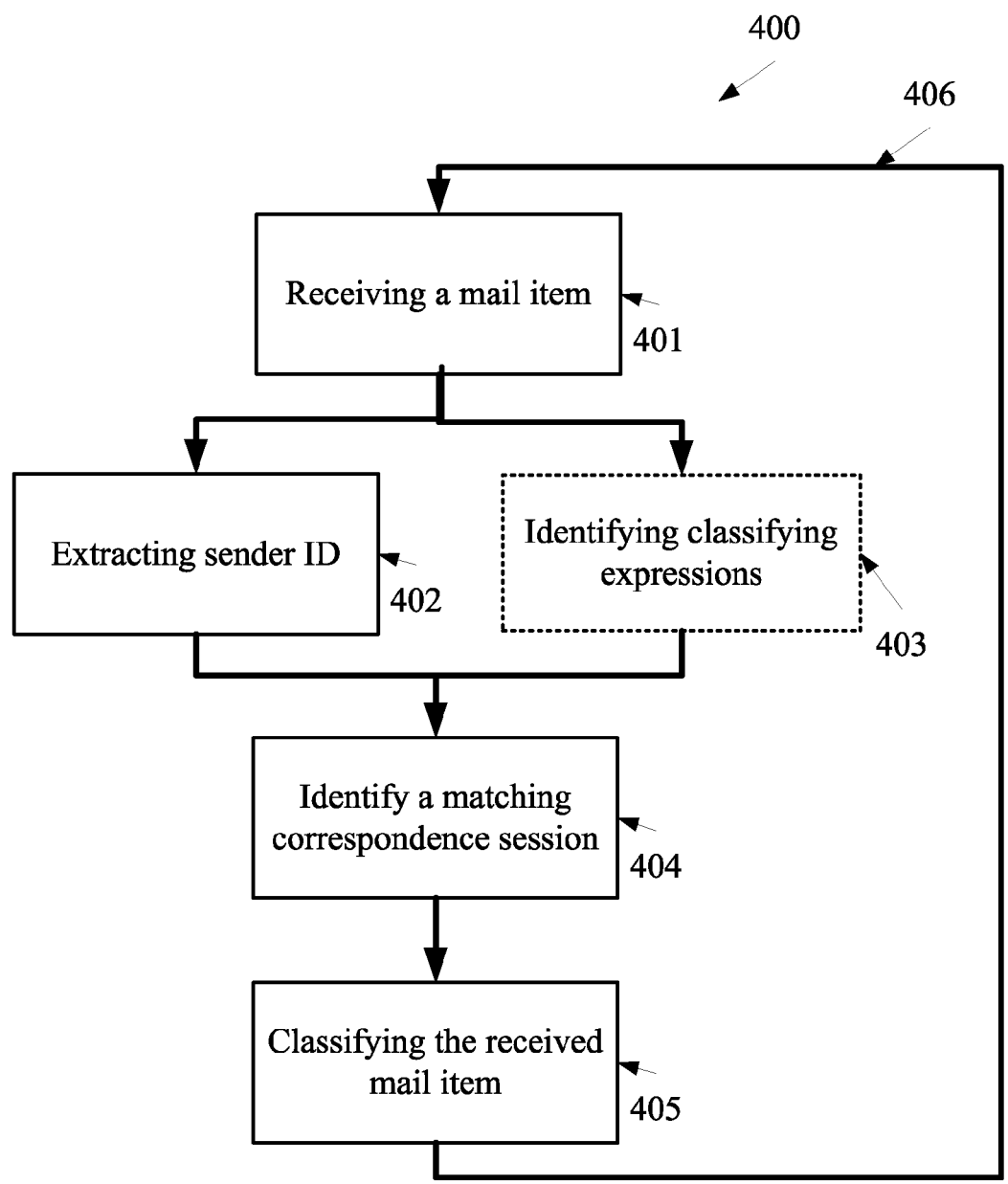
FIG. 2 is a flowchart of a method of sorting and/or classifying mail items, according to some embodiments of the present invention.

Reference is now also made to FIG. 2, which is a flowchart of a method 400 of sorting and/or classifying mail items, such as physical and/or virtual mail items (e.g. emails) to different handling entities according to an association with an open correspondence session, which is optionally documented in the repository 102, and the analysis of the content of previously received mail items from this open correspondence session, according to some embodiments of the present invention.

First, as shown at 401, a mail item having a certain unique identifier (ID), such as a sender identifier (ID), a claim ID, a name, an address, an ID number, a client number and/or the like is received, either physically and/or electronically, for example as described above. The certain identifier may be indicative of a subscriber of a company, a client, a student, an applicant, and/or the like and/or of a correspondence session which is held with this subscriber, such as a claim number. The mail item may be acquired from an imaging unit that images postal mails, for example mail items conveyed in the mail sorting machine 105 and/or from a general inbox. Optionally when the mail item is a visualization of a physical item, it is converted to facilitate an analysis of its content. For example, the mail item may be converted using an OCR module to an identify characters therein and converting the visualization to a text file.

Now, as shown at 402, the unique ID is extracted, for example based on an analysis of text in the received mail item. The analysis is optionally performed by the processing unit 102.

Optionally, as shown at 403, the received mail item may be analyzed, optionally semantically, to identify one or more classifying expressions, such as terms for example words, phrases, numbers and/or the like. Optionally, the extracted classifying expressions(s) of the received mail are added to the respective correspondence session record to improve the classification of newer mail items.

As shown at 404, the extracted unique ID is now used to identify matching correspondence session which is held between the receiving entity, for example an organization, and the sender of the received mail item. The identification is optionally performed by matching one or more unique IDs from the received mail item and one or more unique IDs documented as related to the stored correspondence sessions and/or the respective mail items. The one or more matching correspondence sessions are optionally selected from correspondence sessions which are stored in the repository 102. Optionally, each documented correspondence session is tagged as closed or open. This further allows selecting a suitable correspondence sessions from all the matching correspondence sessions.

Optionally, the received mail item is tagged as related to the selected matching suitable correspondence session, for example added with a title and/or metadata indicative of the matching suitable correspondence session.

Optionally, in the repository, each documented correspondence session is represented in a correspondence session record specifying respective unique ID(s). The correspondence session records may be organized and/or documented in a list, such as a hash table. This reduces the computational complexity of this matching process.

Optionally, each correspondence session record includes a classification of previously received mail items from which it is comprised. The classification may be from a plurality of mail classes, such as different mail requests to different departments, different mail requests to different individuals, different mail responses, different mail notifications and/or the like. For instance, in an insurance organization, a class may be a request for insurance, an insurance claim, a request for reimbursement of medical expenses, a response for a request for details, a response for a request for a payment, a notification, and a change in a status and/or the like.

Optionally, each correspondence session record includes a plurality of reference classifying expressions which are extracted from mail items that comprise it, for example by an analysis, such as a semantic, contextual and/or circumstantial analysis. Such a correspondence session record may interchangeably be referred to as a correspondence session lexicon. The classifying expressions are optionally words, phrases, numbers and/or the like. Optionally, the reference classifying expressions includes identifiers, such as a date, a sender ID, a handling entity ID, a full name, an address and/or department dependent and/or individual words, for example as described below. The classifying expressions are optionally arranged as a dataset, such as a table. Optionally, a correspondence session lexicon is dynamically updated when a new mail item is identified as related thereto. Optionally, the correspondence session lexicons are manually updated.

Optionally, if more than one matching correspondence sessions are identified, additional unique IDs are extracted from the received mail item and matched with unique IDs identified in the mail items of the potential matching correspondence sessions until a match is found. Additionally or alternatively, the matching correspondence sessions are forwarded to a human user for a manual selection that is based on a review. Optionally, the one or more classifying expressions which are extracted in 402 are used for filtering matching correspondence sessions, for example by looking for similar classifying expressions therein.

As shown at 405, the received mail item is classified based on data extracted from the selected matching correspondence session. The classification is optionally based on the classification of mail items of the selected matching correspondence session. For example, if a previously sent mail item in the selected correspondence session is a request for information, the received mail item may be classified as a response to this request. In another example, if a previously sent mail item in the selected correspondence session is a commercial proposal, the received mail item may be classified as a message indicating that the commercial proposal is received. Optionally, the classification of the previously sent mail item is used to filter the optimal classes. In such an embodiment, only potential classes are selected. These potential classes may be forwarded for an automatic classification or this selection may be forwarded for a manual selection, for example sent to be presented to a user that manually classifies the received mail item. This process reduces the number of classes the user has to choose from and therefore reduces the required human labor time and adds quality to the decision.

Additionally or alternatively, the received mail item is classified according to a supervised learning methodology. In this embodiments, each class is represented by a unified classification model (e.g. a graph or function) is generated based on a classification algorithm that is trained by a plurality of mail items for creating this unified classification model. The classification algorithm is optionally a statistical algorithm that analyzes the texts in each mail item in order to create the unified classification model. The statistical algorithm may evaluate a plurality of different dimensions, for example about 50 for each mail class. In use, the received mail item is compared to the unified classification models for finding a match. If no match is found, the mail item is classified as unidentified. In to the unified classification model, templates, specific keywords and/or scripts may be used as additional components of the classification process that enhance overall quality and performance of the classification.

Additionally or alternatively, potential classes may be selected according to an analysis of the extracted semantic classifying expressions and one or more reference classifying expressions which are associated with the selected matching correspondence session. For example, the received mail item may be classified automatically, for example by automatic classification algorithm or based on textual analysis, for instance semantic analysis, contextual analysis and/or the like.

This allows forwarding the classified received mail item to a handling department and/or individual, for example as an email. This also allows instructing the mail sorting machine to select a suitable sorting pass that is associated with the selected handling suitable correspondence session.

As shown at 406, the process may be held, for example iteratively repeated and/or simultaneously, for a number of mail items.

As described above, the received mail item is now classified therefore can be forwarded to a certain handing entity. This allows using information pertaining to the classification of the received mail item and the classification of mail items of the correspondence session thereof for enhancing the processing of the received mail item. Optionally, the system 100 manages for each class a class lexicon, including terms, also referred to as reference terms, (e.g. words and/or phrases) which are related to the class. Optionally, the class lexicons are updated dynamically with new terms which are extracted from mail items. For example, when a mail item is classified as related to class A, terms from this mail item are added to a list and/or used to increase or reduce the weight of terms in such a list.

Figure 3:
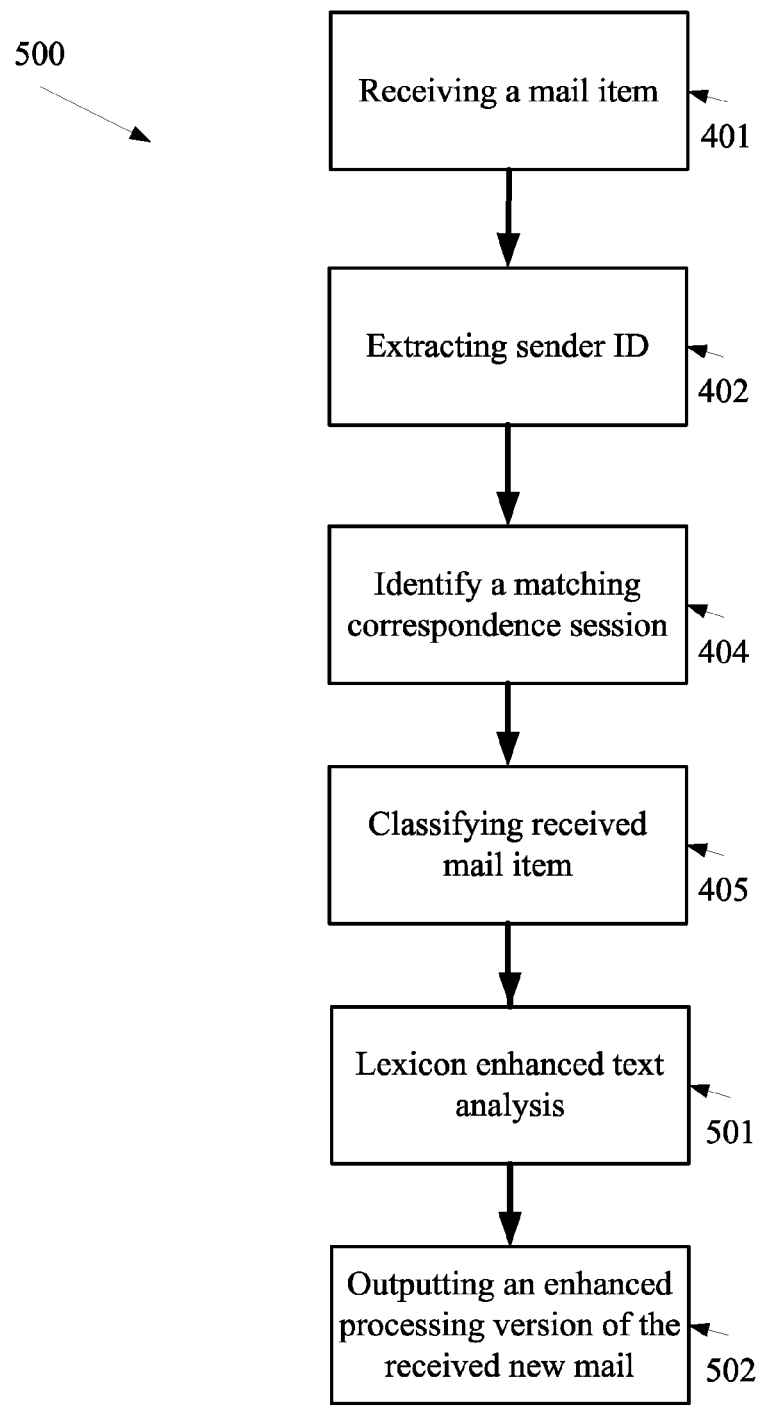
FIG. 3 is a flowchart of a method of processing a received mail item based on related historical mail items, according to some embodiments of the present invention.

Optionally, the class lexicons and/or the correspondence session lexicons are used to improve textual processing of received mail items. For example, reference is now made to FIG. 3, which is a method of processing a received mail item based on the class and/or the correspondence session to which it belongs, according to some embodiments of the present invention. 401-405 are as depicted in FIG. 2 and described above; however, as shown at 501, in this method the content of the received mail is further analyzed based on the class lexicon of its class and/or the correspondence session lexicon of the correspondence session to which it belongs. This allows, as shown at 502, outputting an enhanced version of the received new mail. For example, if the mail item includes text extracted from a pixelated graphic file that has been scanned from a postal mail item, the pixelated graphic file may be now reprocessed based on the terms, also referred to as reference terms, (e.g. words and/or phrases) which are documented in the correspondence session lexicon and/or the class lexicon. This facilitates outputting an improved OCR outcome, for instance as a file, for example based on re-matching unidentified characters, words, and/or phrases using the respective class lexicon.

Figure 4:
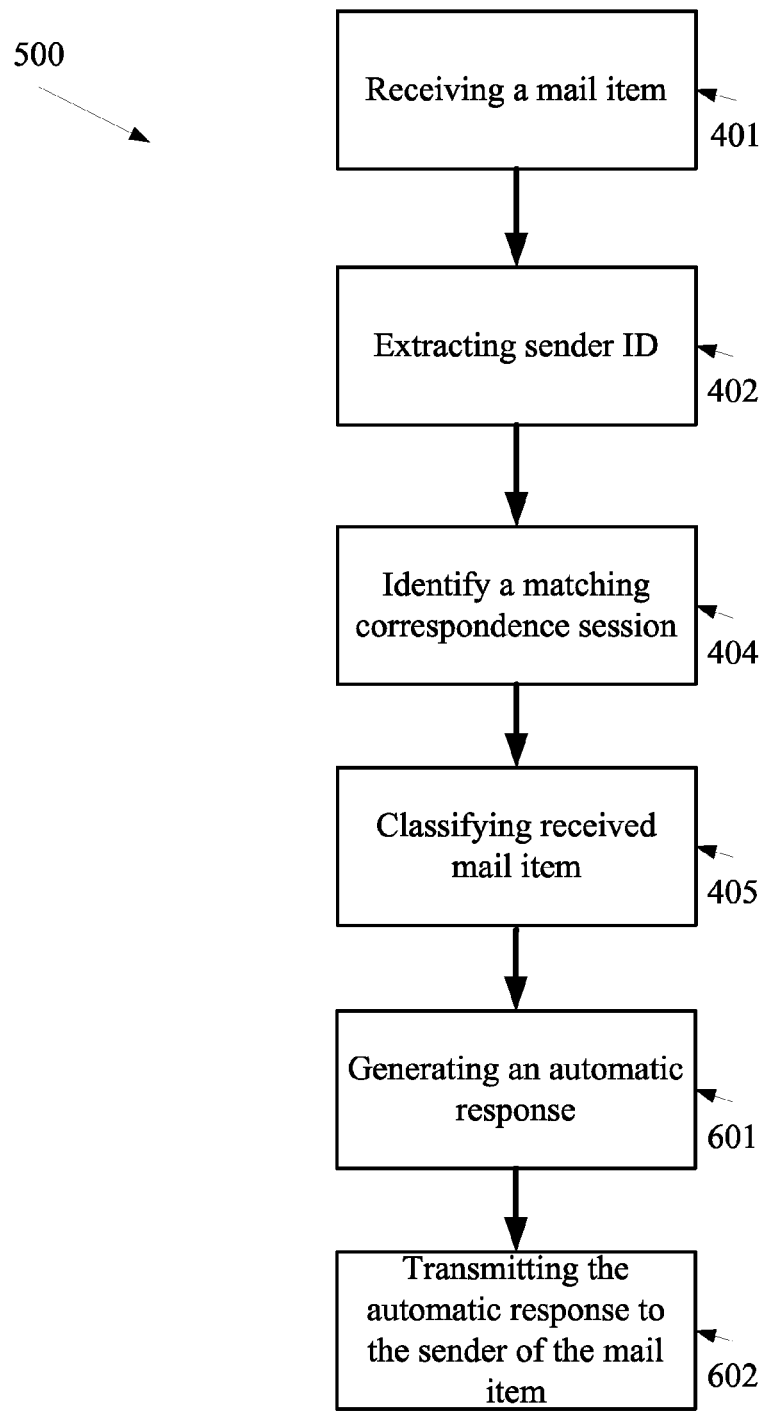
FIG. 4 is a method of generating an automatic and/or a semi automatic response to a received mail item based on related historical mail items, according to some embodiments of the present invention.

According to some embodiments of the present invention, a response mail item that is set to be sent in response to the received mail item is automatically and/or semi automatically prepared based on the classification of the received mail item, the respective class lexicon and/or the correspondence session lexicon of the correspondence session to which it belongs. For example, reference is now made to FIG. 4, which is a method of generating an automatic and/or a semi automatic response to a received mail item based the class of the received item and optionally on information extracted from the correspondence session to which it belongs, namely based on related historical mail items, according to some embodiments of the present invention. 401-405 are as depicted in FIG. 2 and described above; however, as shown at 601 and 602, an automatic response and/or a semi automatic response is generated according to an analysis of classification of the received mail, the respective class lexicon and/or mail items in the selected matching correspondence session to which the received mail item belongs, for example the correspondence session lexicon. While an automatic response is a mail item that is generated and sent automatically, a semi automatic response is a mail item that is partly generated automatically, for example according to a selected template and party updated manually, for example by a human user. The semi automatic response may be sent after been filled in by the user, optionally after a rearrangement and/or rephrasing and using related words from the associated correspondence session lexicon and/or class lexicon and the context.

Figure 5:
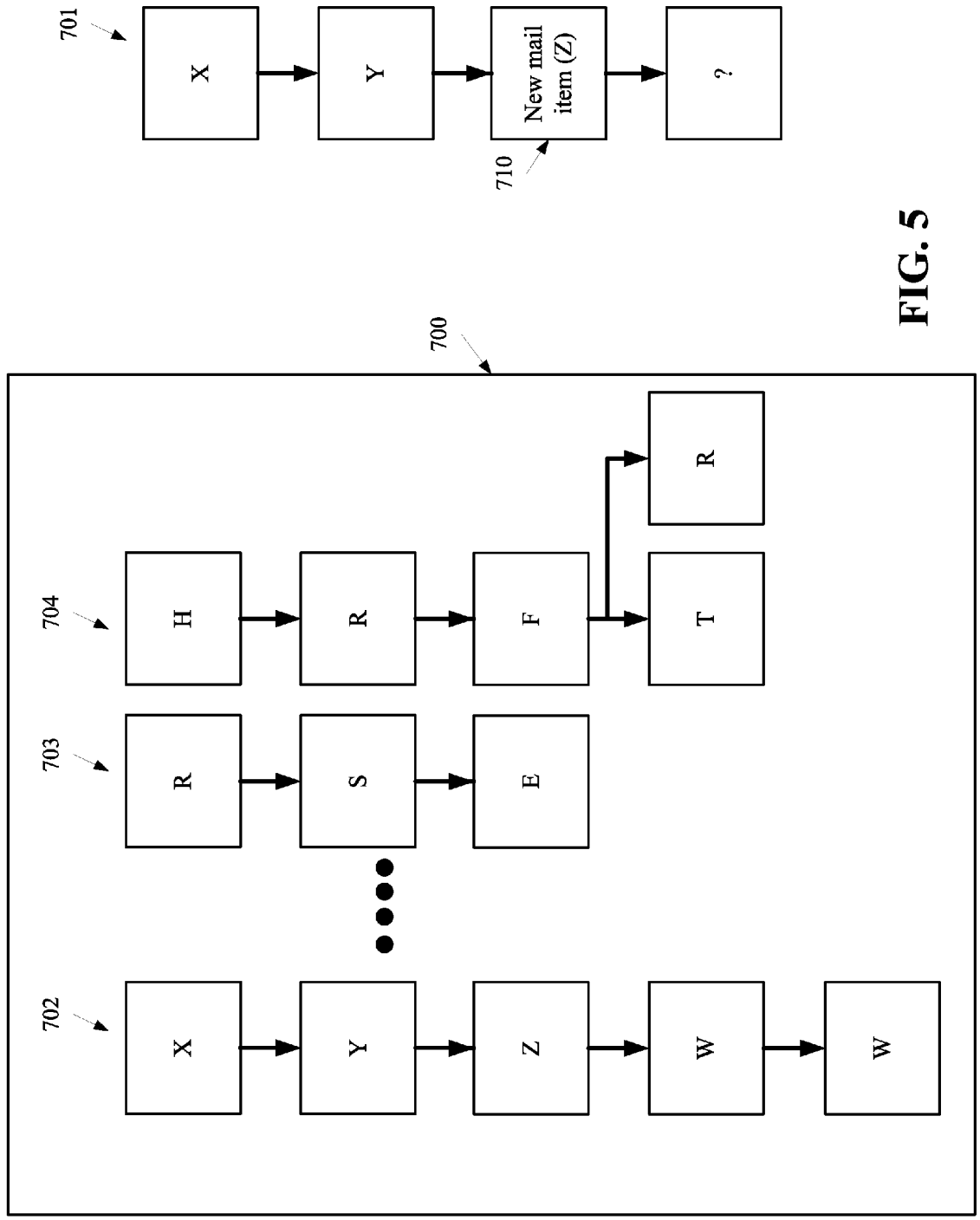
FIG. 5 is a schematic illustration of a set of correspondence session scenarios and a current correspondence session with a newly received mail item thereof, according to some embodiments of the present invention.

Optionally, respective correspondence session is matched with a plurality of correspondence session templates to identify a match to a predefined scenario. In such an embodiment, a database with a plurality of predefined correspondence session scenarios is accessed. A correspondence session scenario is optionally a vector and/or a branch in a tree that includes a set of connected nodes, where each node is another mail item template. In use, the classified mail items of the selected matching correspondence session are matched with classifications of mail item in the matching correspondence session scenarios to identify a matching correspondence session scenario and to identify accordingly a mail item template that may be used. For example, reference is now made to FIG. 5 that is a schematic illustration of a set of correspondence session scenarios 700 where is correspondence session scenario is represented by an array of nodes 702, 703, 704. Each node in the array represents a mail class. In this example, 701 represents a set of classes of ordered mail items of the correspondence session that is identified as related to a received mail item 710, together with the received mail item 710. A match between 701 and 702 is now identified based on the classes of the matched sequence of mail items, X, Y, and Z that is identified both in 701 and in 702.

This allows identifying that template of a mail class W may be used for generating an automatic response to the received mail item that is of mail class Z (710). In this example, mail item template of mail class W is now used for generating an automatic response. Optionally, the template of mail class W is updated with data extracted from previously sent mail items of the respective correspondence session, for example, names, address, facts, numbers and/or, any data that is extracted using semantic and/or contextual analysis.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, an image sensor, and a sorting machine is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of classifying a received mail item in real time, comprising:
    identifying a unique identifier by analyzing a new mail item from a certain sender;
    identifying, according to said unique identifier, a matching correspondence session which is held with said certain sender, said matching correspondence session comprises a sequence of previously sent mail items;
    performing a previously sent mail items analysis said sequence of previously sent mail items;
    performing a new mail analysis of said new mail wherein said new mail is considered as a mail item that continues said sequence of previously sent mail items; and
    selecting a mail class for said new mail from a plurality of mail classes, using a processor, said mail class is selected according to a combination of outcomes of said previously sent mail items analysis and said new mail analysis;
    wherein each of said previously sent mail items analysis and said new mail analysis is selected from a group consisting of semantic analysis, contextual analysis, statistical analysis and circumstantial analysis of data extracted from at least one of said sequence of previously sent mail items and said new mail.

2. The computerized method of claim 1, further comprising forwarding said new mail item or a visualization thereof according to said mail class.

3. The computerized method of claim 1, wherein said matching correspondence session is associated with a correspondence session lexicon that includes a plurality of terms, said mail class is selected using said correspondence session lexicon.

4. The computerized method of claim 1, wherein said mail class is selected according to a match to one of a plurality of unified classification models generated based on a classification algorithm that is trained by a plurality of mail items.

5. The computerized method of claim 1, further comprising analyzing said new mail item to extract at least one classifying expression from the content thereof; wherein said selecting said mail class is performed according to said at least one classifying expression.

6. The computerized method of claim 5, wherein said at least one classifying expression is identified using a semantic analysis of the content of said new mail item.

7. The computerized method of claim 5, wherein said selecting a mail class is performed according to a match between said at least one classifying expression and a at least one reference classifying expression from a class lexicon that is associated with said selected class mail and includes a plurality of reference terms.

8. The computerized method of claim 5, wherein said at least one classifying expression is identified using a contextual analysis of the content of said new mail item.

9. The computerized method of claim 1, wherein said identifying a sender ID comprises imaging said new mail item while it is conveyed by a mail sorting machine having a plurality of sorting passes; further comprising selecting one of said plurality of sorting passes according to said selected mail class and forwarding said new mail in said selected sorting pass.

10. The computerized method of claim 1, further comprising:
    scanning said new mail item to generate a pixelated graphic file;
    performing an identification of characters from said pixelated graphic file; and converting them into a regular text file based on data from said sequence of previously sent mail items.

11. The computerized method of claim 10, wherein said selecting a mail class comprises selecting one of a plurality of inboxes which are associated with a plurality of different handling entities of an organization according to said selected mail class and forwarding said pixelated graphic file to said selected inbox.

12. The computerized method of claim 1, further comprising:
    generating a response to said new mail item based on data from said sequence of previously sent mail items; wherein said generating is performed according to data extracted from said sequence of previously sent mail items and includes matching between said sequence of previously sent mail items and a plurality of scenarios to identify a response template for said response.

13. The computerized method of claim 12, further comprising automatically filling said response template using data extracted from said sequence of previously sent mail items.

14. The computerized method of claim 1, further comprising scanning said new mail item to generate a pixelated graphic file; wherein said selected mail class is associated with a class lexicon that includes a plurality of terms; further comprising performing an identification of characters from said pixelated graphic file using said class lexicon.

15. A system of classifying a received mail item in real time, comprising:

an input unit which receives a new mail item from a certain sender;

a repository which stores a plurality of matching correspondence sessions;

a processing unit which identifies a unique identifier by analyzing a visualization from a pixelated graphic file generated from imaging said new mail and identifies, according to said unique identifier, a matching correspondence session which is held with said certain sender and selected from said plurality of matching correspondence sessions, said matching correspondence session comprises a sequence of previously sent mail items;

a classifying module which performs a previously sent mail items analysis said sequence of previously sent mail items, performs a new mail analysis of said new mail wherein said new mail is considered as a mail item that continues said sequence of previously sent mail items and selects a mail class for said new mail from a plurality of mail classes, said mail class is selected according to a combination of outcomes of said previously sent mail items analsis and said new mail analysis, wherein each of said previously sent mail items analysis and said new mail analysis is selected from a group consisting of semantic analysis, contextual analysis, statistical analysis and circumstantial analysis of data extracted from at least one of said sequence of previously sent mail items and said new mail; and an interface which forwards said new mail item or a visualization thereof according to said mail class.

16. The system of claim 15, wherein said input unit which receives said visualization from a pixelated graphic file generated from imaging said new mail while it is conveyed on a sorting machine having a plurality of sorting passes; wherein said classifying module instructs said sorting machine to convey said new mail in one of said plurality of sorting passes.

17. The system of claim 15, wherein said input unit which receives said visualization from a pixelated graphic file generated from imaging said new mail while it is conveyed on a sorting machine having a plurality of sorting passes; wherein said classifying module forwards said visualization to one of a plurality of inboxes according to said classification.

18. The system of claim 15, wherein said repository being updated according to said new mail item.

19. The system of claim 15, wherein said plurality of matching correspondence sessions are tagged as one of closed and open allowing selecting a suitable correspondence session from said plurality of matching correspondence.

20. The system of claim 19, wherein said new mail is tagged as related to said suitable correspondence session.

* * * * *